June 15, 1937.  C. E. CARPENTER  2,083,829
DOUGHNUT MACHINE
Filed Jan. 21, 1935  2 Sheets-Sheet 1
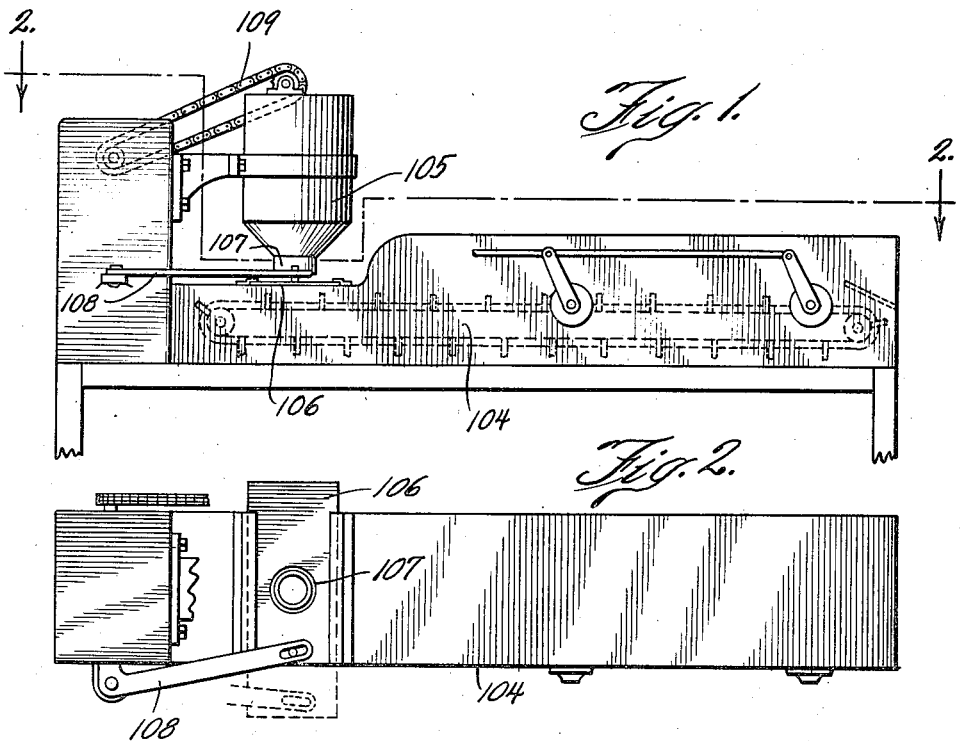
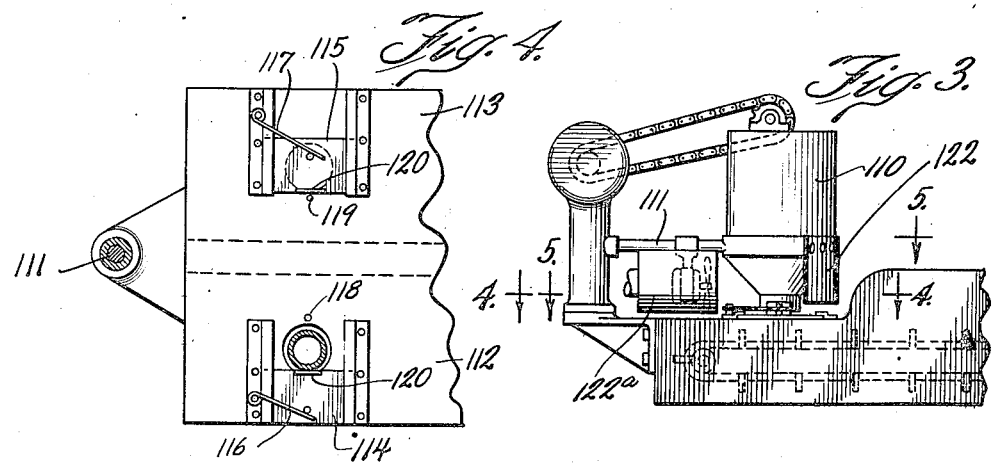
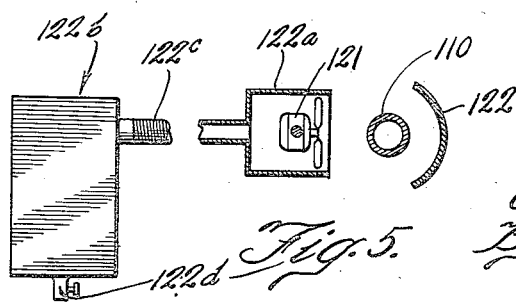
Inventor:
Charles E. Carpenter

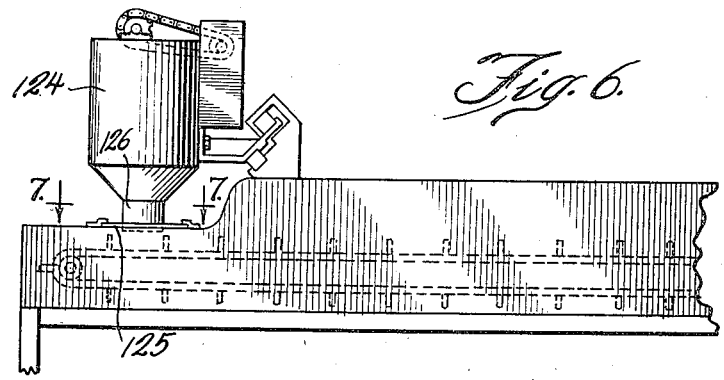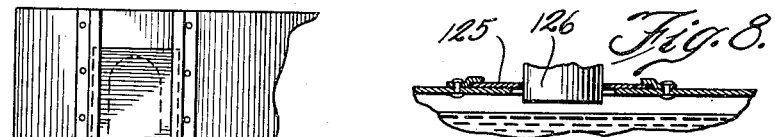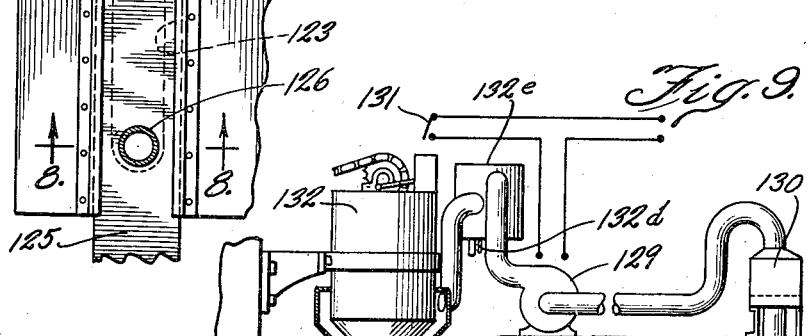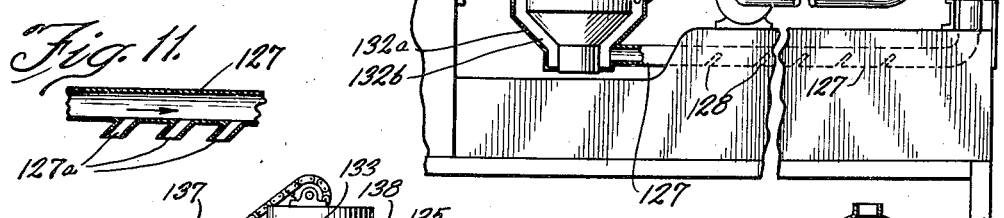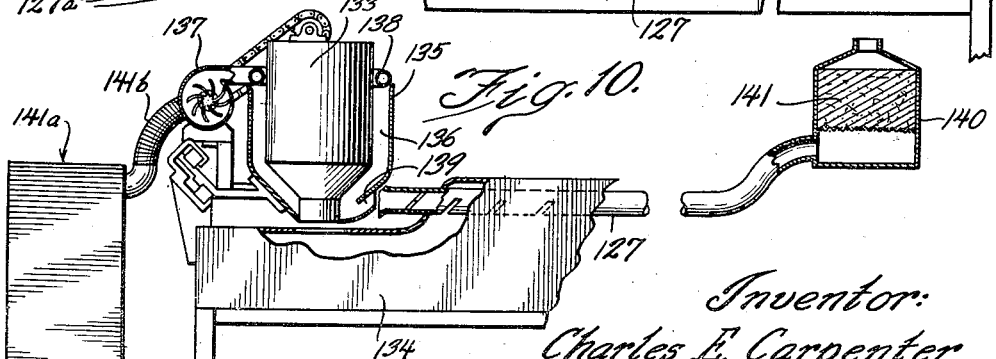

Patented June 15, 1937

2,083,829

UNITED STATES PATENT OFFICE 2,083,829

DOUGHNUT MACHINE

Charles E. Carpenter, Chicago, Ill.

Application January 21, 1935, Serial No. 2,660

7 Claims. (Cl. 107—4)

This invention relates to improvements in doughnut machines and the like. The invention has reference especially to improvements in the cooking devices wherein the cooking operations are carried on, as well as the combination of these devices with the dough-batch forming and dropping devices whereby the dough batches are formed and dropped into the frying pan.

A further feature of the invention relates to the provision of means for cooling or keeping cool the lower portion of the dough hopper and the throat through which the dough batches are delivered to the frying pan. The heat rising from the hot grease and pan tends to heat the lower portion of the dough hopper and the throat, and when these parts become abnormally heated the dough contained therein is also heated and a precooking action occurs which is detrimental to the dough mixture and impairs the quality of the doughnuts thereby produced. An object of the invention is to protect the lower portion of the dough hopper and also the throat from this rising heat so that these parts will not be affected thereby, but will remain relatively cool at all times. In this connection, it is an object to provide a cover plate over the frying pan to prevent the rise of heat therefrom, such pan being provided with a suitable opening through which the dough batches are dropped into the hot grease, and to provide means for keeping such opening closed at all times except when the dough batches are being dropped into the grease. In case the dough batch former is stationary with respect to the frying pan, I provide a movable cover plate for the opening, which cover plate is normally located over the opening but is shifted to an open position each time a dough batch is to be dropped; and in case the dough batch former is movable with respect to the frying pan, I provide an arrangement such that the pan is covered at all times with the exception of the particular location or position where a dough batch is to be dropped so that the rise of the heat is prevented as much as possible.

In some cases I also make provision for cooling the lower portion of the hopper and the throat by means of a current of air directed against these parts. Such current of air may be derived from a fan or from some other suitable source. In any case, however, I have made provision for causing such current of air to strike against and cool all portions of the throat, that is, both sides thereof, so as to ensure an even cooling action.

During the cooking operations there are formed fumes or smells of the hot grease, which are objectionable, and it is desirable to prevent these fumes or smells from entering the room where the machine is located and is being used for cooking. This is especially the case when the machine is placed in a store or lunchroom or the like. It is sometimes inconvenient to make provision for carrying these fumes away by the provision of ducts leading entirely away from the room; and it is therefore an object of the invention to make provision for disposing of this smoke and fumes by means of a suitable treatment device into or through which the fumes are carried, and which device is provided with suitable material for entrapping or converting the fumes so that they are no longer objectionable.

It is also a fact that when a current of air is swept over the surface of the hot grease, such air tends to take up a substantial portion of the vaporizing grease, and carry it away, and the tendency of the grease to give off vapors is thereby increased. This in turn increases the rate of vaporization of the grease, so that undue loss of the grease by evaporation is thus caused. It is a further object of the present invention to prevent this loss by reducing the time during which the current of air is swept over the surface of the hot grease, so that the vaporization is correspondingly reduced. Such reduction of time may be effected either by intermittent flow of the air current, as by starting and stopping the fan intermittently, or by intermittently directing the air current into the duct which leads into the upper portion of the frying pan.

In connection with the feature of cooling the lower portion of the dough hopper and throat, it is an object to in some cases precool the air which is delivered against the hopper and throat, as by means of a suitable refrigerating device. For example, arrangements may be made for drawing cooled air from a refrigerator and for delivering said precooled air to the lower portion of the dough hopper and the neck or throat through which the dough batches are delivered. In this connection and in such cases, provision may also be made for removing the water from the refrigerator, so that the pre-cooled air will be substantially dry.

Another feature of the invention relates to the provision of an arrangement for continuously circulating the same body of air over the upper portion of the liquid grease in the frying pan and around the lower portion of the dough hopper and the delivery throat or neck; and in such case for also, in some cases, removing odors, smoke and fumes from the self-circulated current of air and for cooling the current of air before it is delivered against and around the lower portion of the hopper and the neck or throat.

Other objects and uses of the invention will appear from a detailed description of the same, which consists in the features of construction and combinations of parts hereinafter described and claimed.

In the drawings:

Figure 1 shows a side elevation of an arrangement in which there is a hopper which does not move with respect to the frying pan, and there is provided a shiftable plate for protecting the opening into the pan so as to prevent the rise of hot gases except when the dough batch is to be dropped;

Figure 2 shows a horizontal section on the line 2—2 of Figure 1 looking in the direction of the arrows;

Figure 3 shows a modified arrangement in which there are provided two frying pans located side by side, with a common doughnut former which can be swung back and forth over the end portions of the two pans, there being provided shiftable cover plates over the openings into the two pans, which cover plates are shifted into the open positions when the dough batches are to be dropped into the respective pans;

Figure 4 shows a fragmentary horizontal section on the line 4—4 of Figure 3 looking in the direction of the arrows;

Figure 5 shows a fragmentary horizontal section on the line 5—5 of Figure 3, looking in the direction of the arrows;

Figure 6 shows a view of another modified arrangement in which the dough batch former is shifted back and forth across the end portion of the pan to drop several rows of dough batches therein, there being a cover plate which moves back and forth with the dough batch former;

Figure 7 shows a fragmentary horizontal section on the line 7—7 of Figure 6 looking in the direction of the arrows;

Figure 8 shows a fragmentary vertical section on the line 8—8 of Figure 7, looking in the direction of the arrows;

Figure 9 shows a view of still another modified form of device in which there is provided an air duct extending along through the upper portion of the frying pan and provided with vapor intake openings for removing the smoke and foul vapors, there being provided a circulating fan and a closed circuit system for removal of the smoke and foul vapors from the circulating air, the fan operating intermittently by means of switch connections in timing with the hopper operations;

Figure 10 shows a view of still another modified arrangement in which the duct extending through the upper portion of the frying pan receives blasts of air intermittently from a supply blast due to the intermittent coincidence of the supply duct with the frying pan duct; and Figure 11 shows a fragmentary detail section through a modified form of duct above the grease in the frying pan.

In the arrangement of Figures 1 and 2, there is provided the frying pan 104, and above one end thereof there is the dough batch former 105, which is shown of conventional form. The throat of this dough batch former terminates close to the top of one end of the pan, and drops the dough batches therein. There is provided the slide plate 106 on the top of the frying pan beneath the throat of the dough batch former, said slide plate being provided with the opening 107 through which the dough batches are dropped. A fixed plate is also located on the top of the pan beneath the slide plate 106, said fixed plate being provided with an opening to register with the slide plate opening when the slide plate has been shifted to the proper position. A rock arm 108 is pivoted to a fixed part, and one end of this rock arm connects to the slide plate 106, so that by rocking the arm the plate is slid back and forth. The dough batch former is driven in any convenient manner, as by the chain arrangement 109, and suitable connections are provided for rocking the arm 108 in harmony with the movements of the dough batch former, so that each time a doughnut is to be dropped into the frying pan the slide plate is momentarily shifted over to bring its opening 107 into registry with the delivery position of the throat, and as soon as the dough batch has been dropped the slide plate again moves over to cover the opening.

In the arrangement of Figures 3, 4, and 5, there is provided a single dough batch former 110, which is mounted on a swinging bracket 111, so that this former can be swung back and forth over the end portions of the two frying pans 112 and 113. There is a cover plate over the end portions of both of the pans, and these cover plates are provided with openings through which the dough batches may be dropped into the respective pans. There are the slide plates 114 and 115 for these two openings, and these sliding cover plates are normally moved to the closed positions by means of the springs 116 and 117. Suitable stop pins 118 and 119 are provided to limit the closing movements of the slide plates; and the slide plates are provided with the upstanding lugs 120 which are alternately engaged by the lower end of the throat to shift the slide plates to the open positions when the throat comes into registry with the respective openings. With this arrangement, the openings are normally closed, and they only open when the dough batches are to be dropped.

There is also provided a small fan 121 on the bracket which carries the dough batch former, which fan delivers a constant current of air against the lower portion of the dough batch former and hopper to keep the same cool. If desired, there may also be provided a baffle or deflector plate 122 on the opposite side of the dough batch former and throat so that the air will be deflected back against the back sides of these parts.

Preferably, a shroud or hood 122ᵃ is placed around the fan 121 so as to better direct the current of air against the lower portion of the dough hopper 10 and the throat thereof, which hood is also carried by the bracket 111 and swings back and forth as the dough hopper is swung back and forth.

Also, in the arrangement shown in Figs. 3, 4, and 5, there is shown a refrigerator 122ᵇ, in which air may be cooled either by water, ice or by suitable mechanical refrigerating means, which refrigerator is connected by a flexible conduit 122ᶜ with the shroud 122ᵃ so as to deliver cold air thereto. By this arrangement, the lower portion of the dough hopper and the throat are at all times subjected to a very good cooling action of cold air. If desired, also, a suitable drain cock 122ᵈ may be provided for draining the melted ice or other water from the refrigerator so as to ensure delivery of dry air around the parts during the cooling action.

In the arrangement of Figures 6, 7, and 8, there is provided a wide frying pan having the cover plate provided with the slot 123 so that batches of dough may be dropped from the former 124 into several rows of doughnuts in the pan. For this purpose, the dough batch former may be shifted back and forth in the well understood manner. There is provided a slide plate 125 over the slotted opening 123, which slide plate is of sufficient length to always cover the slot; and the lower end of the throat of the dough batch former extends down through an opening 126 of the slide plate so that the latter is moved back and forth with the back and forth movements of the dough batch former. In this manner the opening to the frying pan is kept closed at all times.

In the arrangement of Figure 9 there is provided a duct 127 extending along the upper portion of the interior of the frying pan, which duct is provided with the backwardly facing slots 128 which will draw smoke and fumes from above the surface of the grease in the pan. There is provided a small electrically driven fan 129, which delivers air to the left-hand end of the duct 127. As this air flows along the duct it induces the smoke and fumes from above the grease to enter through the slotted openings 128, and these are carried along with the air current, and are then delivered from the duct 127 to a chamber 130, which may contain suitable chemical or other material to absorb the smoke and fumes, and thus render them unobjectionable. The clarified air is then again returned to the fan 129, and is again recirculated through the duct 127. In this manner the smoke and fumes are constantly or intermittently removed from above the grease in the frying pan, and also a minimum amount of air is brought into contact with the grease so that there will be a minimum amount of evaporation of grease from the pan.

In this arrangement also there is provided a suitable form of switch 131 operated by or in harmony with the operations of the dough batch former 132, so that the current is intermittently delivered to the motor of the fan 129, and thus this fan operates intermittently. It might otherwise run constantly.

In the arrangement shown in Figure 9, I have also illustrated a shell or hood 132a around the lower portion of the dough hopper and the throat thereof, and separated therefrom to establish the air passage 132b, which passage is closed at its upper end and at its lower end, but is provided with a side connection which leads to the conduit 127. The delivery connection from the fan 129 is carried directly to a refrigerator 132c, wherein the air is cooled, and from this refrigerator the cooled air is carried to the upper portion of the passage 132b, the lower portion of said passage 132b being connected to the duct 127. With this arrangement, the circulating body of air is first cooled and is then delivered around the lower portion of the dough hopper and the throat thereof to keep the same cool, and is then delivered to the duct 127 above the surface of the liquid grease therein. The drain cock 132d is also provided for removing the melted ice or other water from the refrigerator.

In the arrangement of Figure 10 there is provided the dough batch former 133, which delivers dough batches to the pan 134. The lower portion of the dough batch former, and the delivery throat thereof are surrounded by the false shell 135 which establishes the passage or duct 136. There is provided a fan 137 which delivers air to a manifold 138 located around above the upper end of the duct 136, and there are numerous downwardly facing holes in this manifold to deliver air down into the duct around the entire perimeter of the hopper. This air flows down through the duct and keeps the hopper and the throat cool, and the air is then delivered from the lower end of the duct. Preferably, this lower end is closed with the exception of a single discharge orifice 139 through which the delivery of the air takes place. There is also provided the duct 127 extending along through the upper portion of the frying pan, as in the previous arrangement, and as the hopper and dough batch former 133 is shifted back and forth to deliver rows of doughnuts into the pan, the delivery orifice 139 comes periodically into registry with the intake end of the duct 127 and thus delivers intermittent blasts of air into said duct so that the removal of the smoke and fumes from above the grease is intermittent or periodical. The air and fumes delivered from the duct 127 are delivered to the chamber 140, wherein they may be filtered or subjected to the influence of the chemical 141.

In the arrangement shown in Figure 10, the fan 137 draws cold air from a refrigerator 141a, which is connected to the fan by means of a flexible conduit 141b. Preferably, also, a drain cock 141c is provided at the lower portion of the refrigerator for removing the water therefrom in order to ensure dry air being delivered to the fan.

In the modified arrangement of Figure 11, the duct 127 is provided with a series of downwardly and backwardly slanting inlet orifices 127a along its lower side, into which the fumes are induced to enter the duct by the current of air flowing through the duct, this arrangement being a modification in place of the slanting orifices illustrated in Figure 10.

This application is a division of my co-pending application for improvements in Doughnut machines and the like, Serial No. 705,728, filed January 8, 1934, as to certain features herein illustrated and described.

While I have herein shown and described only certain embodiments of my invention, still I do not intend to limit myself thereto except as I may do so in the claims.

I claim:

1. In a doughnut machine, the combination of a frying pan for hot grease, means for forming dough batches and delivering them into said pan, said dough batch forming means being located above the pan, a cover plate over the pan at the position of the dough batch forming means, and provided with an opening for the passage of the dough batches from the forming means into the pan, a movable plate over the pan at the position of said opening, and adapted when in one position to seal said opening and when in another position to unseal said opening to permit delivery of the dough batches into the pan, and means for moving said plate to the unsealed position when the dough batch is delivered by the forming means, substantially as described.

2. In a doughnut machine, the combination of a frying pan for hot grease, means for delivering dough batches into said pan, a cover plate for said pan, a vent duct extending along the upper portion of said pan beneath the cover plate, openings in said duct for induction of smoke and fumes thereinto, and means for inducing entry of said smoke and fumes into said duct comprising means for delivering currents of air through said duct, and for subjecting the withdrawn air and smoke and fumes to smoke and fume removing means, substantially as described.

3. In a doughnut machine, the combination of a frying pan for hot grease, means for delivering dough batches into said pan, a cover plate for said pan, a vent duct extending along the upper portion of said pan beneath the cover plate, openings in said duct for induction of smoke and fumes thereinto, and means for circulating a current of air through said duct, comprising a return connection between the entry and delivery ends of the duct, a fan in said return connection, and smoke and fume removing means in said return connection, substantially as described.

4. In a doughnut machine, the combination of a frying pan for hot grease, means for heating the pan, a dough hopper and dough batch forming means located above the pan, and normally subject to the influence of heat rising from the pan, and means for cooling said hopper and said dough batch forming means, including means for positively directing a blast of cool air transversely of the normal direction of rise of the heated air and fumes from the pan about the hopper and dough batch forming machines, and a jacket about said hopper, in communication with said blast of cool air.

5. In a cooking machine, the combination of a frying pan for hot grease, means for heating the pan, a dough hopper and dough batch forming means located above said pan, a cover for said pan, and means for drawing off the smoke and fumes at a plurality of points along the space between said cover and pan, including a pipe extending along and beneath said cover and a plurality of inlets in said pipe and means for creating low pressure in said pipe, whereby the fumes enter said pipe through said inlet.

6. In a doughnut machine, the combination of a frying pan for hot grease, means for heating the pan, a dough hopper and dough batch forming means located above the pan, and normally subject to the influence of heat rising from the pan, means for cooling said hopper and said dough batch forming means, including a jacket surrounding said hopper, and means for directing a blast of air into said jacket.

7. In a doughnut machine, the combination of a frying pan for hot grease, means for heating the pan, a dough hopper and dough batch forming means located above the pan, and normally subject to the influence of heat rising from the pan, means for cooling said hopper and said dough batch forming means, including a jacket surrounding said hopper, means for directing a blast of air into said jacket, and means for pre-cooling the air delivered to said jacket to a temperature lower than the room temperature of the room in which the machine is located.

CHARLES E. CARPENTER.